Figure 1:
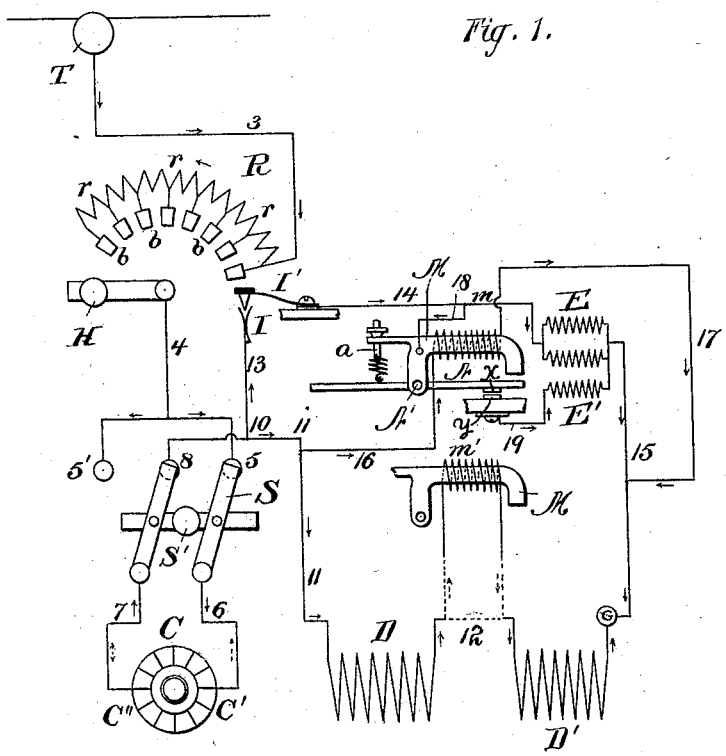

(No Model.)

E. A. SPERRY.
SYSTEM OF CONTROL FOR ELECTRIC MOTORS.

No. 555,291. Patented Feb. 25, 1896.

Witnesses. Inventor.

UNITED STATES PATENT OFFICE.

ELMER A. SPERRY, OF CLEVELAND, OHIO, ASSIGNOR TO THE GENERAL ELECTRIC COMPANY, OF NEW YORK.

SYSTEM OF CONTROL FOR ELECTRIC MOTORS.

SPECIFICATION forming part of Letters Patent No. 555,291, dated February 25, 1896.

Application filed February 16, 1895. Serial No. 538,663. (No model.)

*To all whom it may concern:*

Be it known that I, ELMER A. SPERRY, a citizen of the United States, residing at Cleveland, in the county of Cuyahoga and State of Ohio, have invented certain new and useful Improvements in Systems of Control for Electric Motors, of which the following is a specification.

My invention relates to a system of control for electric motors, and it consists in devices for automatically varying the magnetization of the field of such motor and therefore its speed. In the present invention this device consists in means for automatically causing such variation and preferably in response to variations in an electric current, all of which is more fully described in the accompanying specification, pointed out in the claims and shown in the drawings, in which—

Figure 2:
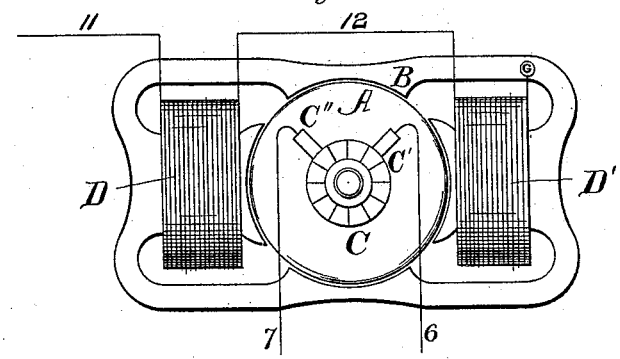

Fig. 1 illustrates a diagrammatic view of the circuits as a whole in one form of carrying the invention into practice; and Fig. 2 is a diagrammatic view of the motor, showing the magnetic as well as the electric circuits therein.

Like letters and numerals of reference indicate like parts throughout.

The armature A revolves in the field-magnets B B, &c., the commutator being indicated at C and the commutator-brushes at C' and C''. These latter are coupled with the wires, and the field-magnets are energized by the coils D and D', which are shown in series circuit relation, but may, of course, be in any other suitable relation and circuit.

E represents a resistance-coil placed in shunt relation to said field-coils D and D', whereby their energizing effect may be reduced or controlled, and an additional coil of this nature is indicated at E'. An electromagnet M operates upon the armature N and bears the coil $m$, the armature being pivoted at N' and provided with an adjusting device $a$. This armature operates to open and close certain contacts X and Y. A reverse-switch S is provided with an operating-handle S'. The rheostat R consists of the sections $r$, which are coupled to the contact-block $b b$, &c., cooperating with the arm H, which is provided with the controlling handle or knob.

T indicates a trolley or other source of electrical supply. A subsidiary contact I is mounted upon a spring I' and co-operates with the lever H when swung clear around to the right. The circuit relation of the coil $m$ may be either that of shunt of field-magnets D and D' or either of them, or may be in series, as shown in the lower fragmentary portion $m'$.

The current passing in at T follows the arrow to the rheostat R by wire 3 through such a portion of the sections $r r$, &c., thereof as may be included and which are determined by the position of the lever H, thence by wire 4 to contact 5 or 5' through the armature connected to the switch S by wire 6, commutator-brushes C' and C'', wire 7, contact 8, wire 9 to point 10, at which the current divides, that flowing through the field proceeding by wire 11 to the field D, thence either by wire 12 or magnet $m'$ to field B', thence to ground, (indicated at G,) or to any other medium of current return to said generator or source of current supply.

When handle and lever H are moving upon a successive contact $b b$, &c., and arrive at the farthermost position to the right they are enabled to force the contacts I together, thus completing a shunt about the field through wire 13, contact I, wire 14, shunt-coil E, wire 15 to the said ground. If the coil $m'$ is located in a shunt of the field D and D', current of wire 11 divides, part passing such coil by wire 16 and passing to ground by wire 17. The extra shunt-coil E' is placed in circuit by a wire 18 whenever the contacts at I and I' are closed by wire 19, and contacts X and Y, which are held together by spring $a$, acting upon the balanced armature N upon which the contact X is mounted.

The armature need not be balanced for the purposes of this invention, but it will readily be understood that when the invention is used in connection with street-cars or like vehicles that are liable to be constantly in vibration it becomes far better to statically balance the armature N, so that the contacts X and Y are always found to sustain a jar in any direction in equilibrium and therefore may not become separated. By this means the extra shunting-coil E' and the operation of the system in connection with the motor are not found in practice to be subject to material change in consequence of the vibration due to operation.

The use and operation of this invention will be readily understood from the foregoing. It will be understood that the operation of the motor attending a diminution of the field magnetization will generally depend upon the load upon the motor and therefore the currents flowing therethrough at the time of such change. Especially will this be noticed in connection with the operation of the commutator-brushes of the motor, these being the points probably most affected. It will be understood that various other methods may be used and controlled, substantially as herein specified, to reduce such magnetization, and the invention extends to such use. Sectional field coils or resistance in series with a shunt-field would be instances of such variations. In increasing the speed of the motor a small or predetermined increment is employed, resulting from the shunting action of the field—for instance, of coils E—and the extra speed beyond this point, gained by throwing into circuit the extra speed-coil E', is only permitted when the load upon the motor is below a stated amount and the current circulating through the fields or through the armature, or both, is below a certain predetermined amount. This prevents destructive sparking at the commutator-brushes, and at the same time enables a motor of a given size and capacity to operate at a very much greater speed than would be permissible were the magnetization of the fields cut down at time of or find themselves under a given saturation at a time of heavy load.

It will be seen that cutting down the field magnetization is but one method of decreasing the counter electromotive force at constant speed of the motor, and this expression may be used to include any means for accomplishing the result. After the action of the device the counter electromotive force may again increase with the speed.

Many other modifications and variations in the construction and details of the apparatus and method of carrying them into effect may be made without departing from the spirit of this invention, and while it is designed to use the various details in the relation shown and described yet they are susceptible of modification as to such relation and some of them may be used without the others, and the invention extends to such use.

Having described my invention, what I claim is—

1. The combination, with an electric motor, of a current-supply, a current-controller for the motor-circuit having a moving part, a device responsive to variations in electric current connected with such motor-circuit for decreasing the counter electromotive force at constant speed of such motor, and means connected with such controller for holding the said responsive means out of operation during a portion only of the movement of said moving part.

2. The combination, with an electric motor, of a current-supply, a current-controller for gradually increasing the current in the motor-circuit from such supply up to a predetermined point, a device responsive to variations in electric current connected with such motor-circuit for decreasing the counter electromotive force at constant speed of such motor, and means connected with such controller for holding the said responsive means out of operation during the operation of the controller up to the said predetermined point.

3. The combination, with an electric motor, of a current-supply, a current-controller for the motor-circuit having a moving part, a device responsive to variations in electric current connected with such motor-circuit for decreasing the counter electromotive force at constant speed of such motor, an additional device for decreasing the counter electromotive force at constant speed of the motor actuated by said moving part, and means connected with such controller for holding the said responsive means out of operation during a portion only of the movement of said moving part.

4. In a shunting-switch for a motor, the combination, with a manually-actuated contact, of a resistance included in circuit with said contact, an additional resistance shunting the aforesaid resistance, and an electromagnetically-operated contact in the circuit of such last-named resistance.

5. In a shunting-switch for a motor, the combination, with a manually-actuated contact, of a magnetically-actuated contact, one portion of which is mounted upon a lever pivoted at its center of gravity, in combination with an adjusting-spring for such lever.

ELMER A. SPERRY.

Witnesses:
A. R. APPLEMAN, Jr.,
E. A. PITKIN.